INVENTORS.
PAUL J. BELANGER and
EDGAR J. RICHARD.

INVENTORS.
PAUL J. BELANGER and
EDGAR J. RICHARD.
BY
ATTORNEY.

3,387,334
MOLDING APPARATUS
Paul J. Belanger, Leominster, and Edgar J. Richard, Fitchburg, Mass., assignors to Foster Grant Co., Inc., Leominster, Mass., a corporation of Delaware
Filed June 10, 1964, Ser. No. 373,968
4 Claims. (Cl. 18—36)

This invention relates generally to the art of manufacturing molded articles and the apparatus therein employed. More specifically, this invention relates to an apparatus for making a substantially continuous groove in a molded thermoplastic object during the molding thereof, and for forming a laminate.

While our apparatus may be adapted for use on many articles, we have found it to be most advantageous when employed in laminating sun or prescription eyeglass frames and molding substantially continuous undercut lens grooves in said eyeglass frames.

It is therefore an object of this invention to provide novel apparatus for forming grooves in molded objects.

Another object of this invention is to provide novel apparatus for molding lens grooves in eyeglasses.

Still another object of this invention is to provide a pivoted core plate for forming a lens groove in eyeglasses, which plate allows the molded eyeglass frame to be easily removed from the mold and core plate.

Still another object of this invention is to provide apparatus for drawing a laminate against the side of the mold cavity.

Still another object of this invention is to provide apparatus for molding a laminated eyeglass frame with a lens opening contained therein.

The foregoing and other objects are achieved in injection molded apparatus through the use of a pivoted core member which provides a groove in the molded object. When the mold is opened, the object is partially peeled from the core and the core subsequently pivots out of the remaining portion of the molded groove.

When it is desired to form a laminate of preformed sheet stock and a molded object having corresponding openings therein, a plug is used to form at least part of the opening in the molded object. This plug is also utilized to draw the sheet stock against one side of the mold cavity. Thermoplastic material is subsequently injected into the mold cavity and bonded to the sheet stock which is firmly held in position against the side of the mold.

Other objects and features of the invention will become apparent by reference to the following specification and to the drawings.

Figure 2:
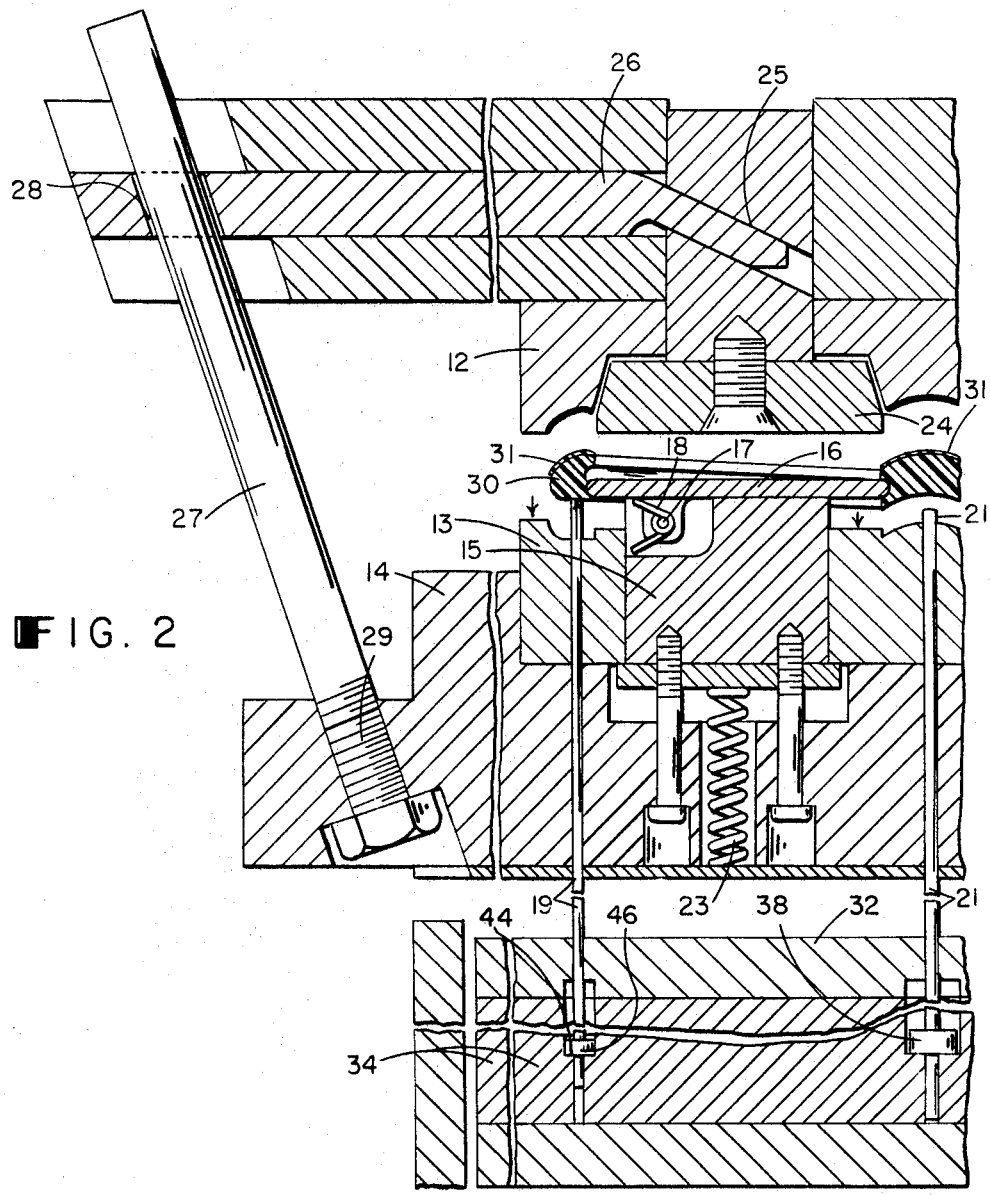
FIG. 2 is a fragmentary section similar to FIG. 1 showing the mold cavity blocks in partially open position.
Figure 3:
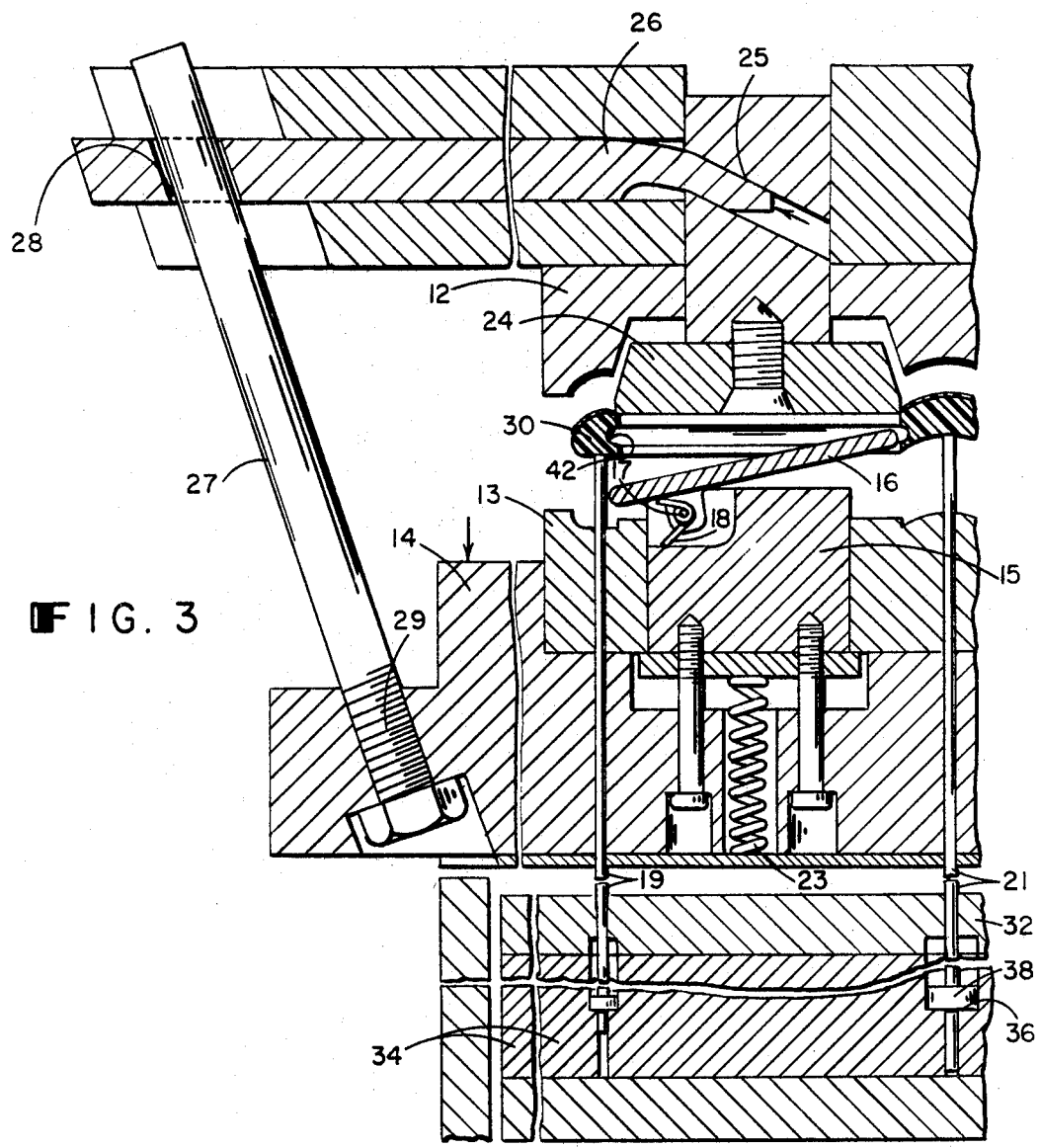
FIG. 3 is a section similar to FIG. 2 showing the mold cavity blocks in open position.
Figure 4:
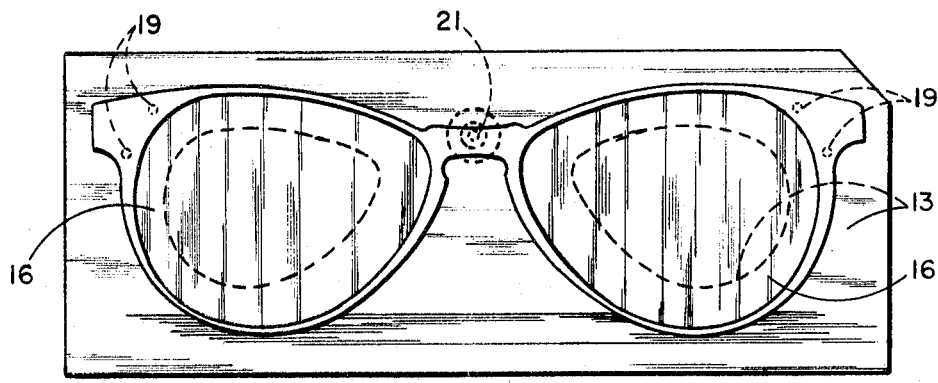
FIG. 4 is a view looking into the ejection mold cavity taken along lines 4—4 of FIG. 1, and with a molded eyeglass frame contained therein.

In the drawings, the mold 11 is shown as consisting of an injection cavity block 12 and an ejection cavity block 13. The ejection block 13 is mounted on plate 14 for movement therewith away from block 12. Block 13 is also provided with central core supports 15 adapted to support lens groove cores 16. The core members 16 are pivoted as at 17 to the members 15 to allow them to pivot as the sunglass frame 30 is stripped therefrom (see FIGS. 2 and 3). After the molded object has been stripped from cores 16, the cores are returned to their original position due to the bias of springs 18.

The block 13 is also equipped with ejector pins 19 and 21 which are actuated upon movement of block 13 to strip the molded object from the cores 16. The central support members 15 are adapted to move a short distance outwardly from the block 13 in bore 22 through the medium of compression springs 23. The ejector pins 19, 21 are actuated shortly after initial opening movement of the block 13 when shoulders 36, 44 strike bumpers 38, 46 carried by backup plate 34.

In order to provide for the placing of a preformed sheet of laminate 31 into the mold there are provided plugs 24 in block 13. Each plug is provided with slot 25 adapted to be actuated by cam member 26 to move the plug 24 from an extended to a retracted position and back. The cam member 26 is adapted to be actuated by cam rod 27 and follower groove 28. Cam rod 27 is mounted for movement with block 13 and plate 14. The cam rod 27 is affixed to plate 14 by any conventional means. By way of example it is shown as having a threaded portion 29 which is screwed into a tapped portion on plate 14.

Figure 1:
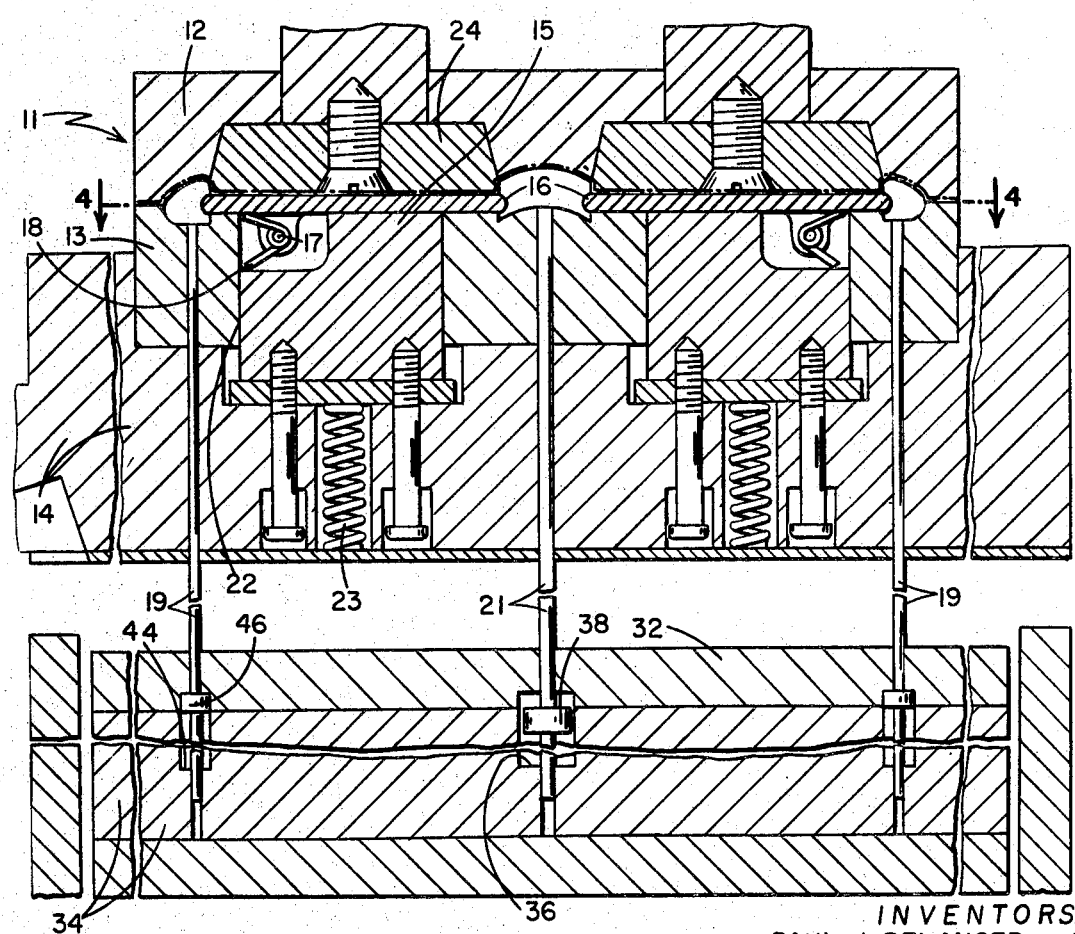
FIG. 1 is a side section of a molding apparatus employing the invention.
Figure 5:
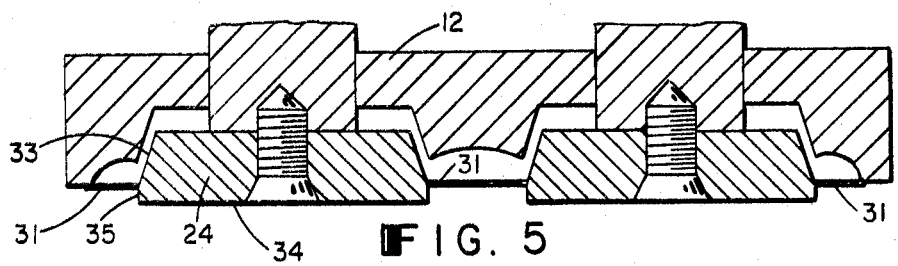
FIG. 5 is a fragmentary sectional view showing the mold plugs in their extended position with the laminate placed thereon.
Figure 6:
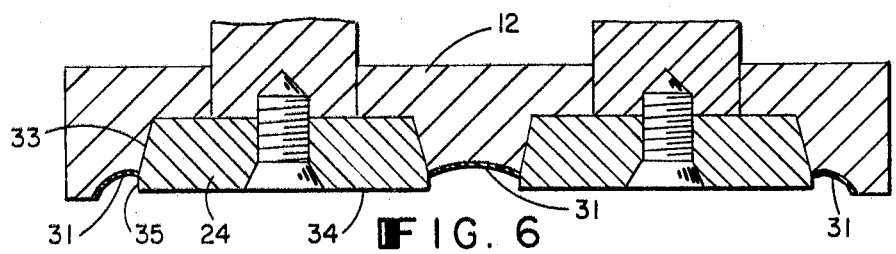
FIG. 6 is a section similar to FIG. 5 showing the plugs in their retracted position, having drawn the laminate against the side of the mold cavity.

In operation the preformed sheet 31 is placed over plugs 24, the plugs conforming in shape to the lens openings in the sheet. The sides 33 of the plugs 24 are preferably divergent in the direction of the ejection cavity block 13 to a point immediately adjacent the end 34. The end portions 35 which project into the mold cavity are substantially parallel so as to form the front side of the lens groove. When the laminate sheet stock 31 is placed over the plugs 24, it is firmly held on the plugs by reason of the friction fit between the openings in the stock 31 and the plugs 24. This is accomplished by making the lens openings in the stock material 31 slightly smaller in size than the periphery of plug ends 35. The stock 31 is stretched slightly upon placing it over plugs 24; and shrinks into a friction fit with the sides 33 of plugs 24 when it is released. (FIG. 5.) The mold is then moved from the open position substantially as shown in FIG. 5 to the closed position shown in FIG. 1 and FIG. 6. The movement of block 13 and plate 14 causes the cam rod 27 to move inwardly and cause cam member 26 to actuate cam follower slot 25 and move the plug 24 into its retracted position thereby drawing the laminate 31 against the side of the mold. The thermoplastic material is then injected into the mold where it is bonded to the laminate sheet stock 31 and allowed to cool. Subsequent to cooling of the material, the block 13 and plate 14 are withdrawn and the molded frame is supported by the core members 16. During this movement, ejector pins 19, 21 and member 15 move outwardly relative to the mold block 13 (see FIG. 2). Upon further movement of the block 13 and plate 14, the ejector pins begin to strip the ends of the molded object from the core members 16. As the block 13 and plate 14 progress rearwardly the molded object is progressively stripped from the core 16 to a point where it is stripped past the pivots 17. At this point, the moment arm having moved past pivots 17, further stripping action causes the plates 16 to pivot outwardly about pivots 17 (see FIG. 3), thus allowing the core member 16 to slide out of the groove 42. Further relative movement of the ejector pins 19, 21 will move the molded object completely free of the core 16 and allow the object to drop away from the mold cavities. When the molded frame falls free the spring 18 will urge the core plate 16 back into its original position as shown in FIG. 1.

While an exemplary embodiment of the invention has

What is claimed is:

1. Apparatus for molding an undercut portion into a molded object; said apparatus including:
   complementary mold cavity blocks;
   one of said blocks including a core member pivotally mounted for movement relative thereto for forming a substantially continuous groove in said molded object;
   said core member being in the form of a substantially rigid unitary plate for forming the entire groove;
   at least one ejector pin located at the lateral extremity of said one mold block;
   said ejector pin being movable to initially partially peel the molded object from the core member;
   whereby the core member is withdrawn from the remaining portion of the undercut upon continued movement of the ejector pin relative to the mold cavity block.

2. Molding apparatus for forming a substantially continuous groove in a molded object; said apparatus comprising:
   complementary mold cavity blocks;
   at least one of said mold cavity blocks having a rigid core member for forming said groove;
   said core member having a periphery substantially corresponding to the shape of the molded groove, and being of unitary construction;
   ejector means for ejecting the molded object from said core member;
   said ejector means being adapted to initially peel the molded object from said core member;
   means for pivotally mounting said core member so as to allow pivotal movement with respect to the molded object subsequent to the initial peeling action of the ejector means;
   whereby the core member is pivoted out of the undercut groove upon further movement of the ejector means.

3. Apparatus for molding substantially continuous lens grooves for sunglass frames; said apparatus comprising:
   complementary mold cavity blocks adapted to mold an eyeglass frame;
   one of said blocks including core members for forming the lens grooves in the eyeglass frames;
   each of said core members being in the form of a substantially rigid unitary plate having a periphery corresponding to the shape of the molded groove;
   said mold block including central core support means mounted for rectilinear movement with respect to the mold block;
   each of said core members being pivotally attached to said central bore means for movement from a molding position to a withdrawal position;
   biasing means for urging the core members into the molding position;
   ejector pins mounted adjacent the lateral edges of the mold cavity;
   said core members and central core support means being adapted to move outwardly of the mold cavity upon initial opening of the mold;
   means for causing said ejector pins to move relative to the mold cavity block upon further movement of said block to initially peel the lateral extremities of the eyeglass frame from the core members and thereby causing the eyeglass frame to pivot the core members whereby the core members are withdrawn from the lens grooves and the molded frame is completely ejected from the mold.

4. Molding apparatus for molding a thermoplastic object and a laminate having at least one aperture therein; said apparatus including:
   complementary mold cavity blocks;
   a plug member carried by one of said mold cavity blocks;
   said plug member being adapted to form at least a part of said aperture;
   said plug member being formed to correspond to the shape of the aperture and being slightly larger than the aperture at its largest point and having sides, at least a portion of which are diverging in the direction of the mold cavity;
   means for extending said plug member into the mold cavity and retracting said plug member thereby drawing the apertured laminate surrounding said plug member adjacent the side of the mold cavity so as to be subsequently laminated to the thermoplastic material which is injected into the mold cavity.

References Cited

UNITED STATES PATENTS

| | | | |
|---|---|---|---|
| 1,589,913 | 6/1926 | Wells | 18—36 X |
| 1,989,724 | 2/1935 | Villanyi. | |
| 2,275,591 | 3/1942 | Leonard. | |
| 2,357,950 | 9/1944 | Goessling | 18—36 X |
| 2,560,024 | 7/1951 | Brown. | |
| 2,611,151 | 9/1952 | Carter et al. | 18—36 |
| 2,982,997 | 5/1961 | Peickii et al. | |
| 3,104,425 | 9/1963 | Crane et al. | |
| 3,126,582 | 3/1964 | Scott. | |
| 3,226,771 | 1/1966 | Szugda | 18—42 |
| 3,266,100 | 8/1966 | Belanger. | |

FOREIGN PATENTS

| | | |
|---|---|---|
| 890,459 | 11/1943 | France. |
| 1,237,243 | 6/1960 | France. |
| 644,459 | 9/1962 | Italy. |

J. HOWARD FLINT, Jr., *Primary Examiner.*